United States Patent
Fürstenhöfer et al.

(10) Patent No.: US 12,325,307 B2
(45) Date of Patent: Jun. 10, 2025

(54) TRANSMISSION DEVICE FOR AN ELECTRICALLY DRIVEABLE VEHICLE, DRIVE DEVICE FOR AN ELECTRICALLY DRIVEABLE VEHICLE, AND VEHICLE

(71) Applicant: Valeo Siemens eAutomotive Germany GmbH, Erlangen (DE)

(72) Inventors: Christian Gerhard Fürstenhöfer, Fürth (DE); Stefan Paul, Pinzberg (DE); Bernd Haas, Nuremberg (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 411 days.

(21) Appl. No.: 17/780,580

(22) PCT Filed: Nov. 24, 2020

(86) PCT No.: PCT/EP2020/083125
§ 371 (c)(1),
(2) Date: May 27, 2022

(87) PCT Pub. No.: WO2021/105082
PCT Pub. Date: Jun. 3, 2021

(65) Prior Publication Data
US 2023/0001793 A1 Jan. 5, 2023

(30) Foreign Application Priority Data
Nov. 29, 2019 (DE) .................. 10 2019 132 499.8

(51) Int. Cl.
*B60L 1/00* (2006.01)
*B60L 50/00* (2019.01)
(Continued)

(52) U.S. Cl.
CPC ............ *B60L 1/00* (2013.01); *B60R 16/0215* (2013.01); *F16H 57/027* (2013.01);
(Continued)

(58) Field of Classification Search
CPC ........ B60L 1/00; B60L 50/00; B60R 16/0215; F16H 57/027; F16H 63/3458;
(Continued)

(56) References Cited

U.S. PATENT DOCUMENTS 8,978,862 B2 * 3/2015 Heuver .................. B60T 1/062
192/219.5
9,353,859 B2 * 5/2016 Larsson .............. F16H 63/3433
(Continued)

FOREIGN PATENT DOCUMENTS

DE 102015217875 A1 * 3/2017
DE 102017124499 A1 * 4/2018 ......... F16H 63/3433
(Continued)

OTHER PUBLICATIONS

Office Action Issued in Corresponding EP Application No. 20 812 254.9, dated Jan. 4, 2024. ( 6 Pages ).
(Continued)

*Primary Examiner* — James A Shriver, II
*Assistant Examiner* — Ian Bryce Shelton
(74) *Attorney, Agent, or Firm* — Osha Bergman Watanabe & Burton LLP (57) ABSTRACT

A transmission device for an electric vehicle that includes a transmission element, a parking lock with a parking lock actuator which blocks the transmission element, and a transmission housing which encloses the transmission element and the parking lock. The device further includes a first connection apparatus that has a first cable arrangement that extends into the transmission housing and a first plug connector by which the first cable arrangement connects the exterior of the transmission housing to the parking lock actuator. The device further includes a pressure equalization apparatus which runs through the first plug connector of the first connection apparatus and forms a gas-permeable con-
(Continued)

nection between the interior of the parking lock actuator and the exterior of the transmission housing.

14 Claims, 5 Drawing Sheets

(51) Int. Cl.
    *B60R 16/02*     (2006.01)
    *F16H 57/02*     (2012.01)
    *F16H 57/027*     (2012.01)
    *F16H 63/34*     (2006.01)

(52) U.S. Cl.
    CPC .......... *F16H 63/3458* (2013.01); *B60L 50/00* (2019.02); *F16H 2057/02034* (2013.01); *F16H 2057/02043* (2013.01)

(58) Field of Classification Search
    CPC . F16H 2057/02034; F16H 2057/02043; F16H 61/0003; F16H 63/3416; Y02T 10/70; Y02T 10/7072; Y02T 90/14
    See application file for complete search history.

(56) References Cited

U.S. PATENT DOCUMENTS

| | | | | |
|---|---|---|---|---|
| 10,407,041 | B2 * | 9/2019 | Heubner | F16H 63/3466 |
| 10,704,684 | B2 * | 7/2020 | Heo | F16H 63/3475 |
| 10,718,432 | B2 * | 7/2020 | Kim | F16H 63/3458 |
| 10,867,722 | B2 * | 12/2020 | Eshima | H01B 7/0045 |
| 10,876,628 | B2 * | 12/2020 | Gruber | B60K 1/00 |
| 10,995,850 | B2 * | 5/2021 | Inoue | F16H 61/0213 |
| 11,005,242 | B2 * | 5/2021 | Yamamoto | H01B 7/18 |
| 11,009,129 | B2 * | 5/2021 | Kamiya | F16H 63/3433 |
| 11,273,802 | B2 * | 3/2022 | Hanker | B60T 1/005 |
| 11,312,319 | B2 * | 4/2022 | Eshima | H02G 3/0406 |
| 11,499,633 | B2 * | 11/2022 | Lenke | F16H 63/3433 |
| 11,946,544 | B2 * | 4/2024 | Vornehm | F16H 63/3466 |
| 2014/0216885 | A1 * | 8/2014 | Heuver | F16H 63/3483 192/219.4 |
| 2016/0061323 | A1 * | 3/2016 | Larsson | F16H 63/3433 74/411.5 |
| 2018/0154881 | A1 * | 6/2018 | Heubner | F16D 65/14 |
| 2019/0154149 | A1 * | 5/2019 | Gruber | B60K 1/00 |
| 2019/0178372 | A1 * | 6/2019 | Heo | F16H 63/34 |
| 2019/0271394 | A1 * | 9/2019 | Kramer | F16D 63/006 |
| 2020/0018394 | A1 * | 1/2020 | Kim | F16H 59/105 |
| 2020/0023818 | A1 * | 1/2020 | Hanker | F16H 57/00 |
| 2020/0103015 | A1 * | 4/2020 | Okuhata | F16H 63/3416 |
| 2020/0127527 | A1 * | 4/2020 | Nakamatsu | H02K 7/116 |
| 2020/0166124 | A1 * | 5/2020 | Inoue | F16H 61/0213 |
| 2020/0168357 | A1 * | 5/2020 | Eshima | H01B 7/368 |
| 2020/0200270 | A1 * | 6/2020 | Lenke | F16H 63/3466 |
| 2020/0262364 | A1 * | 8/2020 | Eshima | H02G 3/0406 |
| 2020/0295546 | A1 * | 9/2020 | Yamamoto | H02G 3/34 |
| 2020/0300359 | A1 * | 9/2020 | Kamiya | F16H 63/3433 |
| 2021/0070239 | A1 * | 3/2021 | Maeda | H01B 7/0045 |

FOREIGN PATENT DOCUMENTS

| | | | | |
|---|---|---|---|---|
| DE | 102017212466 | A1 * | 1/2019 | |
| DE | 102019200379 | A1 * | 7/2019 | B60T 1/005 |
| EP | 1256747 | A2 * | 11/2002 | F16H 59/44 |
| EP | 3670973 | A1 * | 6/2020 | B60K 17/04 |
| JP | S60116951 | A | 6/1985 | |
| WO | 2017057070 | A1 | 4/2017 | |
| WO | WO-2018145696 | A1 * | 8/2018 | F16H 63/3425 |

OTHER PUBLICATIONS

Office Action issued in counterpart Japanese Application No. 2022-531549, dated Aug. 4, 2023 (6 pages).
Office Action issued in counterpart Chinese Application No. 202080082934.8, dated Sep. 22, 2023 (11 pages).

* cited by examiner

TRANSMISSION DEVICE FOR AN ELECTRICALLY DRIVEABLE VEHICLE, DRIVE DEVICE FOR AN ELECTRICALLY DRIVEABLE VEHICLE, AND VEHICLE

The present invention relates to a transmission device for an electrically driveable vehicle, to a drive device for an electrically driveable vehicle, and to a vehicle.

The document DE 10 2015 217 875 A1 discloses a drive system with an electric machine and a transmission for a motor vehicle. The transmission has a transmission output shaft and a transmission housing, and also a parking lock.

By integrating a parking lock in a transmission housing, construction space that is scarce, in particular with regard to the use of the transmission device in an electric drive device of a vehicle, can be saved. However, this poses special challenges due to the presence of lubricants and higher temperatures inside the transmission housing. In particular, a parking lock actuator of the parking lock can react sensitively to the lubricant, even to the extent of a functional failure.

The invention is based on the object of specifying a construction-space-saving and robustly operable option for arranging a parking lock in a transmission housing.

This object is achieved according to the invention by a transmission device for an electrically driveable vehicle, comprising a transmission element, a parking lock, by means of which the transmission element can be blocked and which has a parking lock actuator, a transmission housing, which encloses the transmission element and the parking lock, a first connection apparatus with a first cable arrangement extending in the transmission housing and a first plug connector by means of which a first end of the first cable arrangement can be contacted from the exterior of the transmission housing, wherein a second plug connector on a second end of the first cable arrangement is electrically connected to the parking lock actuator, and a pressure equalization apparatus, which runs through the first plug connector of the first connection apparatus and forms a gas-permeable connection between the interior of the parking lock actuator and the exterior of the transmission housing.

The invention is based on the finding that functional failures of the parking lock actuator can frequently be attributed to the penetration of lubricants into the parking lock actuator. This intrusion is due to a pressure difference between the interior of the parking lock actuator and the surroundings thereof. The pressure equalization apparatus provided in the transmission device according to the invention equalizes the pressure between the interior of the parking lock actuator and the exterior of the transmission housing, and thereby prevents the lubricant from penetrating. This advantageously enables a more robust operation of the transmission device. Owing to the fact that the pressure equalization apparatus runs through the first plug connector, advantageously no additional construction space is required for the passage of the pressure equalization apparatus.

The transmission housing typically has a transmission housing opening through which the first connection apparatus passes. In a preferred embodiment, it is provided that the first plug connector of the first connection apparatus is arranged in the transmission housing opening and/or is fastened to the transmission housing. The parking lock can be configured to be electrically supplied and/or activated via the first connection apparatus.

In the case of the transmission device according to the invention, it is preferred if the pressure equalization apparatus has a fluid guiding element, in particular a hose or a pipe, which connects the first plug connector to the interior of the parking lock actuator. The fluid guiding element is preferably formed from a plastic, in particular PTFE.

It can advantageously be provided that the fluid guiding element is guided together with the first cable arrangement from the parking lock actuator to the first plug connector. As a result, the construction space provided in the transmission housing can be optimally utilized by the first connection apparatus and the fluid guiding element. It is possible, for example, for the fluid guiding element to be guided parallel to individual cables of the first cable arrangement. In a preferred embodiment, it is also provided that the first cable arrangement and the fluid guiding element are sheathed together.

It is also advantageous if the first plug connector has a plug connector housing, contact elements, and through openings which are formed in the plug connector housing and which are each designed to receive one of the contact elements, wherein the fluid guiding element is inserted into one of the through openings. In this way, the gas-permeable connection can be implemented with little effort in the region of the first plug connector by, for example, in the case of a commercially available plug connector, a through opening not being provided with a contact element and instead accommodating the fluid guiding element. Provision is typically made for a respective contact element to be arranged in some of the through openings.

With regard to the connection of the pressure equalization apparatus on the parking lock actuator side, it is preferred, in the case of the transmission device according to the invention, if the second end of the first cable arrangement is electrically connected to the parking lock actuator by the second plug connector of the first connection apparatus and the pressure equalization apparatus extends into the second plug connector.

It can also be provided here that the second plug connector has a plug connector housing, contact elements, and through openings which are formed in the plug connector housing and which are each designed to receive one of the contact elements, wherein the fluid guiding element is inserted into one of the through openings. Provision can be made for a respective contact element to be arranged in some of the through openings.

On the parking lock actuator side, in particular on a parking lock actuator housing, it is possible to provide a plug connector which is diametrically opposed to the second plug connector of the first connection apparatus and by means of which the pressure equalization apparatus extends into the interior of the parking lock actuator. This plug connector on the parking lock actuator side can also have a plug connector housing, contact elements, and through openings which are formed in the plug connector housing and which are each designed to receive one of the contact elements, wherein a through opening provides a clearance with respect to the interior of the parking lock actuator housing as part of the pressure equalization apparatus.

In a development of the transmission device according to the invention, it can be provided that it furthermore comprises a second connection apparatus with a second cable arrangement and a third plug connector which is arranged at one end of the second cable arrangement and by means of which an electrical plug-in connection is formed or can be formed with the first plug connector of the first connection apparatus, wherein the pressure equalization apparatus has a fluid guiding element, in particular a hose or a pipe, wherein one end of the fluid guiding element extends into the third plug connector of the second connection apparatus. This fluid guiding element can also be understood to be or can be referred to as a second fluid guiding element. The fluid guiding element of the first connection apparatus can then also be understood to be or can be referred to as a first fluid guiding element.

With regard to the third plug connector of the second connection apparatus, it can be provided that it has a plug connector housing, contact elements, and through openings which are formed in the plug connector housing and which are each designed to receive one of the contact elements, wherein the second fluid guiding element is inserted into one of the through openings. Provision can be made for a respective contact element to be arranged in some of the through openings.

With regard to the second connection apparatus, it can be provided that it has a fourth plug connector at the other end of the second cable arrangement.

Furthermore, it is expedient if the pressure equalization apparatus has a pressure equalization adapter at the other end of the fluid guiding element. The pressure equalization adapter serves in particular to close off the pressure equalization apparatus outside the transmission housing.

The pressure equalization adapter can, for example, have a membrane and/or a fastening means for fastening the pressure equalization adapter. The pressure equalization adapter can also include a protective device, for example a protective cap, for protecting the membrane. The protective cap typically provides protection against water and/or protection against foreign bodies, in particular within the meaning of a corresponding IP class of protection.

In an advantageous embodiment, it is also provided that the pressure equalization adapter and the fourth plug connector of the second connection apparatus are designed as separate components. In this way, the pressure equalization adapter can be attached outside the housing at a suitable location separate from the fourth plug connector.

As already indicated at the beginning, it is also preferred, in the case of the transmission device according to the invention, if a lubricant bath for lubricating the transmission element is provided in the transmission housing and the parking lock is at least partially located in the lubricant bath. Owing to the pressure equalization realized according to the invention, an arrangement of the parking lock in the lubricant bath is then advantageously also possible, as a result of which previously unused arrangement positions of the parking lock in the transmission housing are opened up.

The object on which the invention is based is also achieved by a drive device for an electrically driveable vehicle, comprising an electric machine, a transmission device according to the invention, and a shaft which transmits a rotational motion of the electric machine to the transmission device.

It can be provided that the transmission housing is part of a housing enclosing the electric machine, the transmission device, and the shaft. The pressure equalization adapter is preferably fastened to the housing, in particular to an end plate, by the fastening means.

The drive device can also include an inverter, wherein the fourth plug connector of the second connection apparatus can be electrically connected to the inverter. The inverter is typically configured to convert a DC voltage into an AC voltage that supplies the electric machine.

Finally, the object on which the invention is based is also achieved by a vehicle, comprising a drive device according to the invention which is configured to drive the vehicle.

Figure 1:
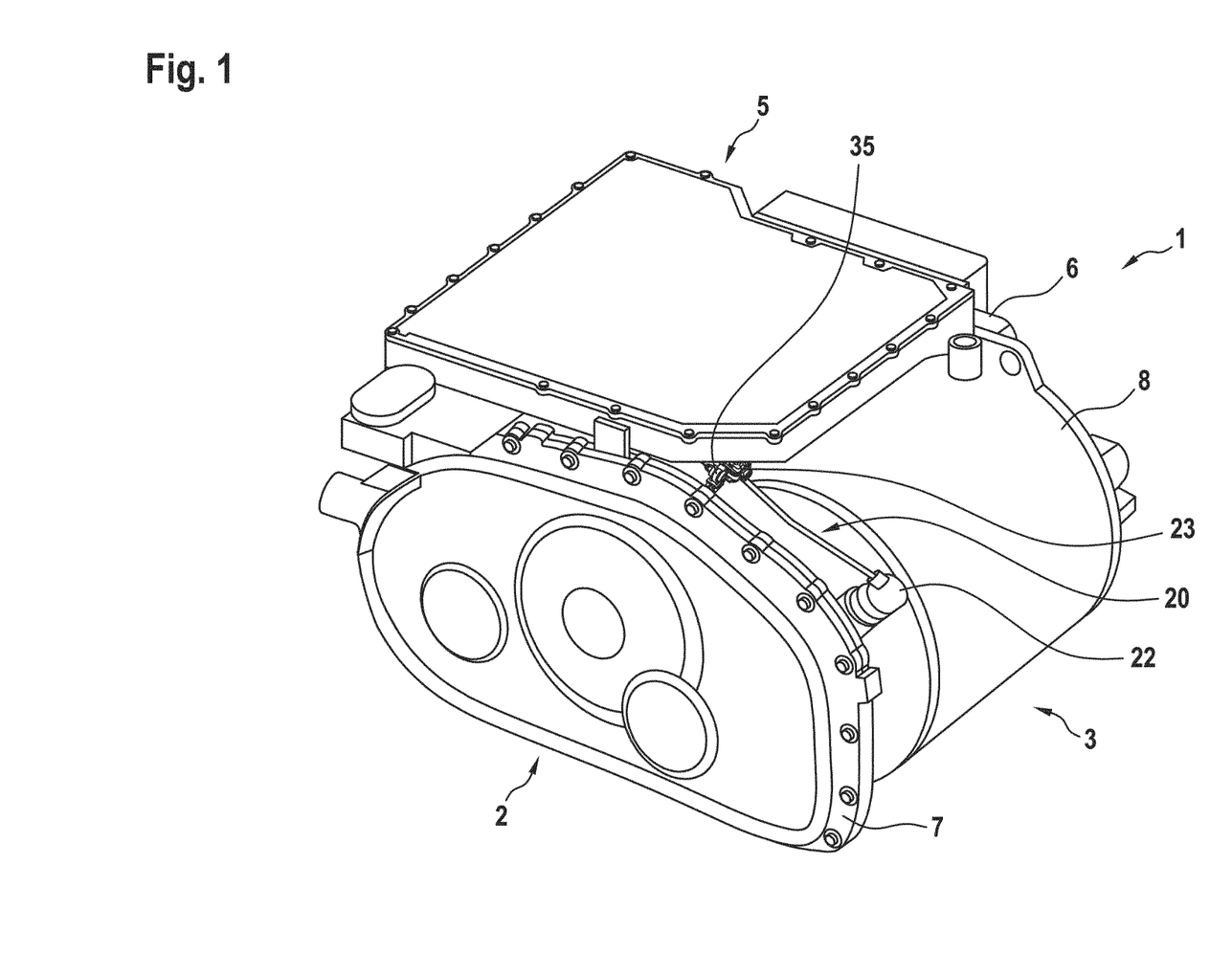
FIG. 1 shows a perspective view of an exemplary embodiment of the drive device according to the invention with an exemplary embodiment of the transmission device according to the invention.

Further advantages and details of the present invention emerge from the exemplary embodiments described below and on the basis of the drawings. These are schematic illustrations in which:

FIG. 1 is a perspective view of an exemplary embodiment of a drive device 1 with an exemplary embodiment of a transmission device 2.

In addition, the drive device 1 includes an electric machine 3, a shaft 4 (see FIG. 2), which transmits a rotational motion of the electric machine 3 to the transmission device 2, and an inverter 5, which is designed to convert a DC voltage into an AC voltage supplying the electric machine 3. A housing 6 of the drive device 1 comprises a transmission housing 7 of the transmission device 2, the transmission housing belonging to the transmission device 2, and a machine housing 8, which also encloses the inverter 5. Alternatively, the inverter 5 can also be arranged in a separate housing which is fastened to a housing enclosing the transmission device 2 and the electric machine 3.

Figure 2:
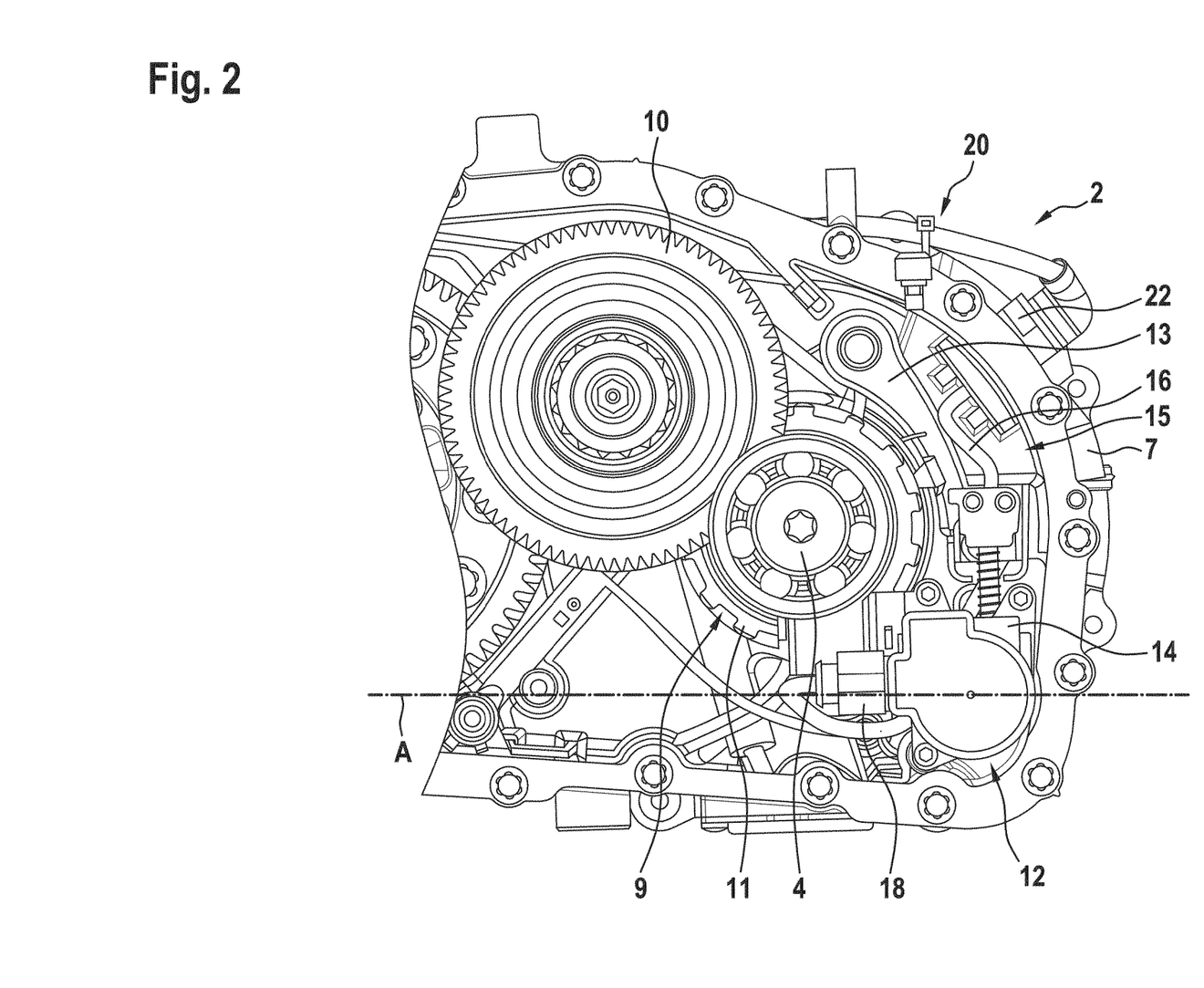
FIG. 2 shows a detailed view of the interior of the transmission device.

FIG. 2 is a detailed view of an interior of the transmission device 2.

The transmission device 2 comprises a transmission element 9 which is coupled to further transmission elements 10 in order to convert a rotational motion provided by the shaft 4, which is connected to the transmission element 9 for rotation therewith. Also fastened to the transmission element 9 is a parking lock wheel 11 of a parking lock 12, by means of which the transmission element 9 can be blocked. For this purpose, the parking lock 12 also has a parking lock pawl 13 which can be brought into engagement with the parking lock wheel 11 by means of a parking lock actuator 14 of the parking lock 12.

The transmission elements 9, 10 and the parking lock 12 are enclosed by the transmission housing 7. In order to lubricate the transmission elements 9, 10, the transmission device 2 has a lubricant bath, the operationally conventional filling level of which is indicated by a chain-dotted line A in FIG. 2. As can be seen, the parking lock 12 is partially located in the lubricant bath.

In addition, the transmission device 2 comprises a first connection apparatus 15 which comprises a first cable arrangement 16 which extends in the transmission housing 7 and which includes a first plug connector 17—concealed in FIG. 2—(see FIG. 3) and a second plug connector 18 and serves for the electrical supply and activation of the parking lock actuator 14. The plug connectors 17, 18 are attached to opposite ends of the first cable arrangement 16, wherein the second plug connector 18 is connected to a plug connector of the parking lock actuator 14—which plug connector is concealed in FIG. 2 by the second plug connector 18. The first cable arrangement 16 can be contacted from the exterior of the transmission housing 7 through the first plug connector 17.

Figure 5:
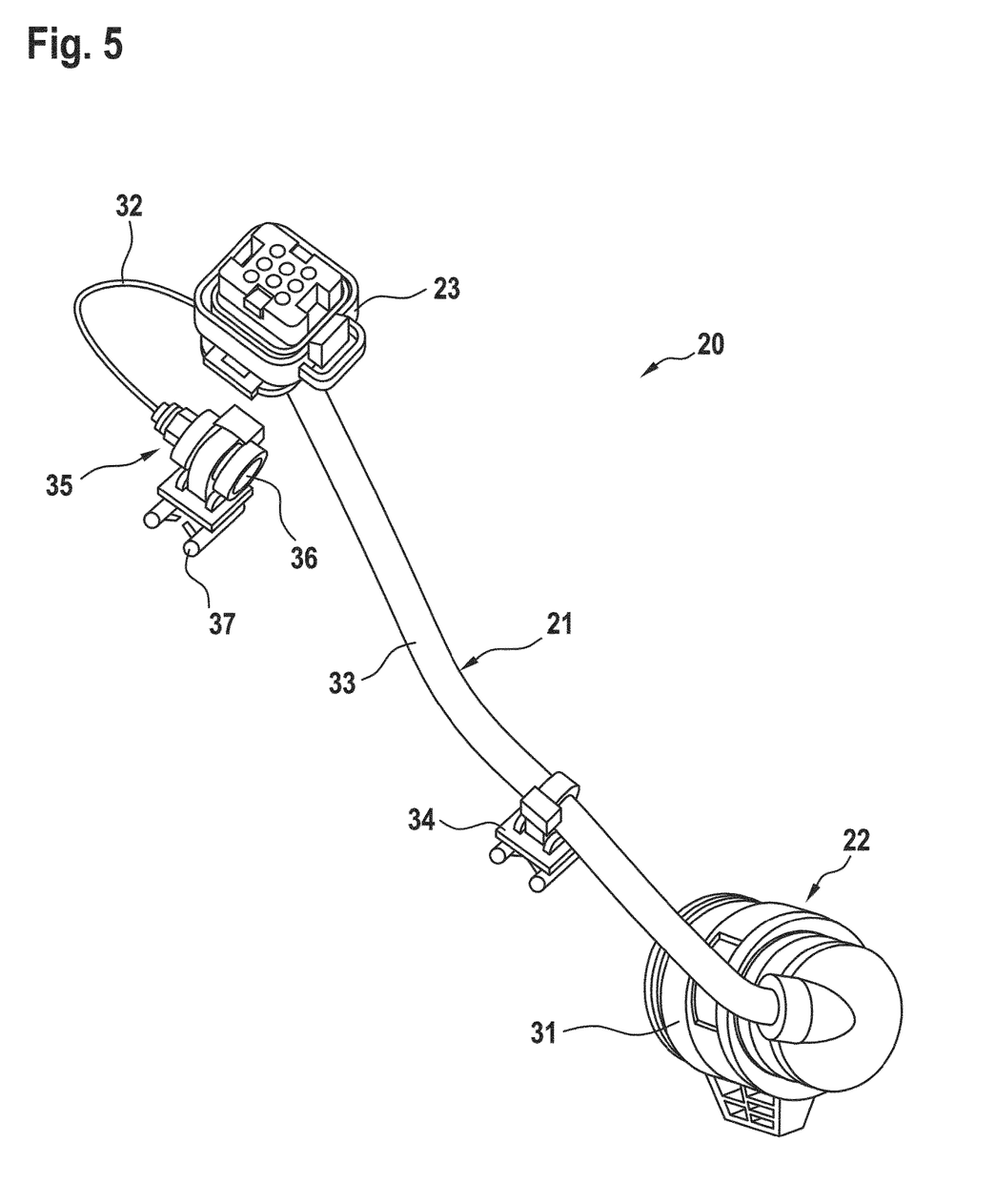
FIG. 5 shows a perspective view of the second connection apparatus of the transmission device.

In addition, the transmission device 2 comprises a second connection apparatus 20 which comprises a second cable arrangement 21 extending outside the transmission housing 7, a third plug connector 22 and a fourth plug connector 23 (see FIG. 1 and FIG. 5). The third plug connector 22 of the second connection apparatus 20 forms a plug-in connection with the first plug connector 17 of the first connection apparatus 15. The fourth plug connector 23 forms a further plug-in connection with a plug connector of the inverter 5, which is concealed in FIG. 1, such that the inverter 5 can electrically supply and activate the parking lock actuator 14 via the connection apparatus 15, 20.

Figure 3:
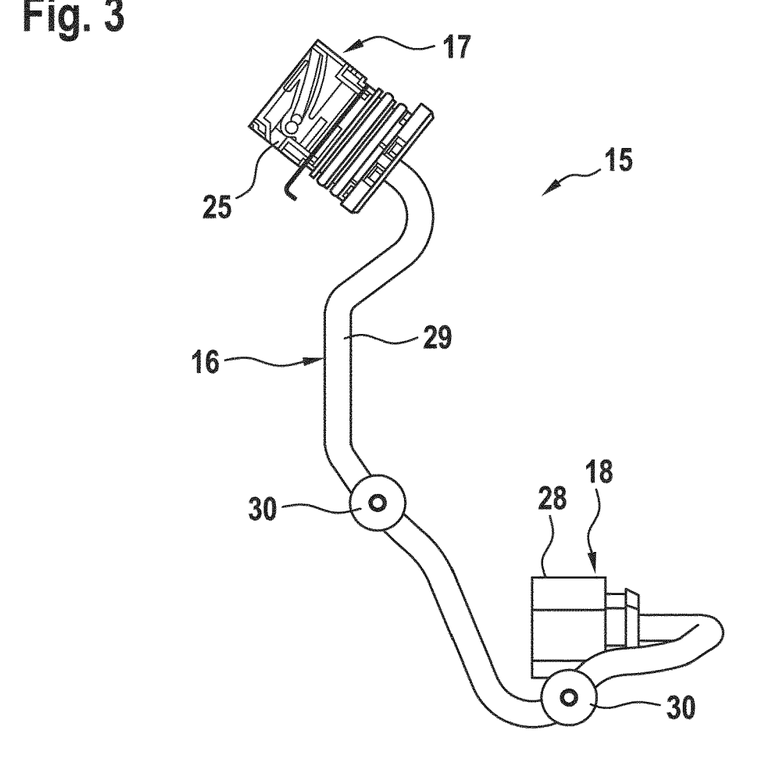
FIG. 3 shows a perspective view of the first connection apparatus of the transmission device.
Figure 4:
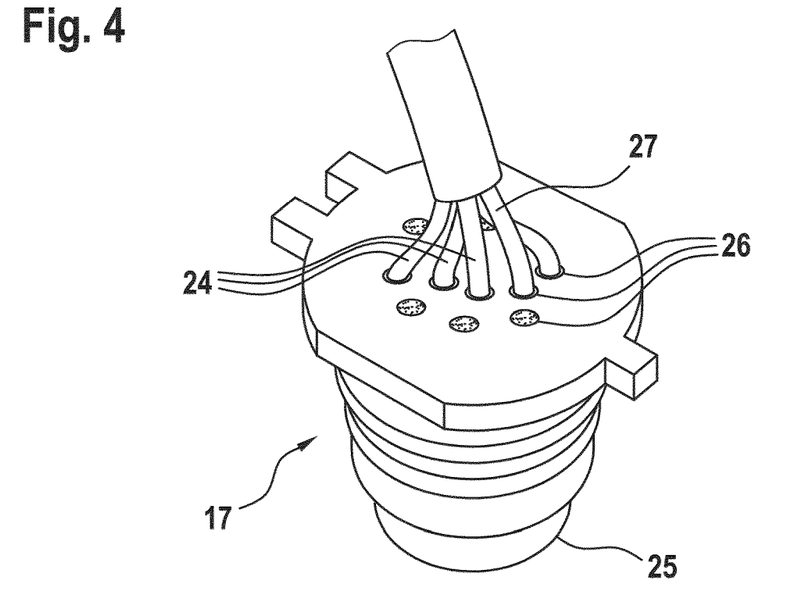
FIG. 4 shows a detailed view of the first connection apparatus in the region of its first plug connector.

FIG. 3 and FIG. 4 show the first connection apparatus 15, wherein FIG. 3 is a perspective view and FIG. 4 is a detailed view in the region of the first plug connector 17.

As can be seen from FIG. 4, the first cable arrangement 16 has a plurality of individual cables 24. The first plug connector 17 comprises a plug connector housing 25 in which a plurality of through openings 26 are formed. Some of the through openings 26 each accommodate a contact element which is concealed in the figures and which is electrically connected to one of the individual cables 24 within the plug connector housing 25. If the number of through openings 26 exceeds the number of individual cables 24 by one—as in the present exemplary embodiment—some of the through openings 26 can be sealed in a gas-tight manner. The second plug connector 18 is constructed analogously, such that the individual cables 24 are electrically connected there to corresponding contact elements, which are also accommodated in corresponding through openings in a plug connector housing 28 of the second plug connector 18.

Since the lubricant inside the transmission housing 7 (see FIG. 2) means that there is the risk of it penetrating into the parking lock actuator 14 (see FIG. 2) due to a negative pressure occurring therein and being able to cause malfunctions or even damage, a pressure equalization apparatus is provided which forms a gas-permeable connection between the interior of the parking lock actuator 14 and the exterior of the transmission housing 7.

For this purpose, the pressure equalization apparatus first of all comprises a first fluid guiding element 27, which connects the first plug connector 17 of the first connection apparatus 15 to the second plug connector 18 of the first connection apparatus 15 in a gas-permeable manner. In the present exemplary embodiment, the first fluid guiding element 27 is formed, for example, by a hose made of PTFE. For this purpose, one end of the first fluid guiding element 27 opens into a through opening 26 that is neither occupied nor closed by an individual cable 27. The other end of the first fluid guiding element 27 opens into a through opening in the plug connector housing 28 of the second plug connector 18, which through opening is likewise neither occupied nor closed by a contact element. The first fluid guiding element 27 is guided together with the individual cables 24 of the first cable arrangement 16 within a sheathing 29 of the first cable arrangement 16 which additionally has fastening elements 30 (see FIG. 3) for fastening the first connection apparatus 15 in the transmission housing 7.

To form the gas-permeable connection through the pressure equalization apparatus, the plug connector of the parking lock actuator 14 (see FIG. 2) is connected to the interior of the parking lock actuator 14 in a gas-permeable manner. For this purpose, the plug connector of the parking lock actuator 14, which is designed substantially analogously to the first plug connector 17 of the first connection apparatus 15, is formed in a gas-permeable manner with respect to the interior of the parking lock actuator, such that the plug connector of the parking lock actuator 14 forms an end of the pressure equalization apparatus on the parking lock actuator side. For this purpose, the plug connector of the parking lock actuator 14 can likewise have through openings, analogously to the first plug connector 17 of the first connection apparatus 15, one of which is gas-permeable.

FIG. 5 is a perspective view of the second connection apparatus 20 of the transmission device 2.

Analogously to the first cable arrangement 16 of the first connection apparatus 15, the second cable arrangement 21 of the second connection apparatus 20 has a plurality of individual cables. The third plug connector 22 comprises, likewise analogously to the first plug connector 17 of the first connection apparatus 15, a plug connector housing 31, in which a plurality of through openings are formed. Some of the through openings each accommodate a contact element which is electrically connected to one of the individual cables within the plug connector housing 31. If the number of through openings exceeds the number of individual cables by one—as in the present exemplary embodiment—some of the through openings are sealed in a gas-tight manner.

The pressure equalization apparatus has a second fluid guiding element 32. One end of the second fluid guiding element 32 opens into a through opening in the plug connector housing 31, which through opening is neither occupied by a contact element nor sealed in a gas-tight manner. The second fluid guiding element 32 is guided together with the individual cables of the second cable arrangement 21 within a sheathing 33 of the second cable arrangement 21 which additionally has a fastening element 34 for fastening the second connection apparatus 20 to the transmission housing 7. The second fluid guiding element 32 branches off from the second cable arrangement 21 just before the fourth plug connector 23.

The pressure equalization apparatus has a pressure equalization adapter 35 at the other end of the second fluid guiding element 32, wherein the pressure equalization adapter 35 and the fourth plug connector 23 are designed as separate components, as can be seen. The pressure equalization adapter 35 has a membrane 36 which prevents dirt and the like from penetrating into the pressure equalization apparatus. Furthermore, the pressure equalization adapter 35 comprises a fastening means 37. By means of the latter, the pressure equalization adapter 35, as can be seen from FIG. 1, is fastened in the region of the inverter 5 to the transmission housing 7.

The fourth plug connector 23 of the second connection apparatus 20 is connected to the plug connector of the inverter 5 in order to electrically supply and activate the parking lock actuator 14 from the inverter 5.

Figure 6:
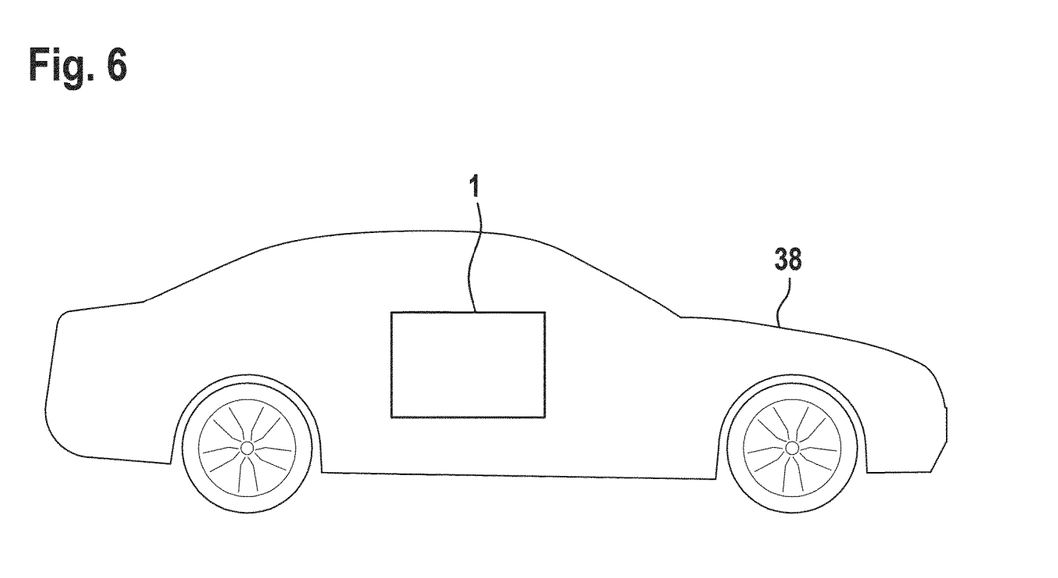
FIG. 6 shows a schematic diagram of an exemplary embodiment of the vehicle according to the invention.

FIG. 6 is a schematic diagram of an exemplary embodiment of a vehicle 38. The latter comprises the drive device 1, which is configured to drive the vehicle 38.

The invention claimed is:
1. A transmission device for an electrically driveable vehicle, comprising:
   a transmission element;
   a parking lock, by which the transmission element is blocked and comprising a parking lock actuator;
   a transmission housing, which encloses the transmission element and the parking lock;
   a first connection apparatus with a first cable arrangement extending in the transmission housing and a first plug connector by which a first end of the first cable arrangement contacted from an exterior of the transmission housing, wherein a second end of the first cable arrangement is electrically connected to the parking lock actuator;

a pressure equalization apparatus, which runs through the first plug connector of the first connection apparatus and forms a gas-permeable connection between an interior of the parking lock actuator and the exterior of the transmission housing;

a second connection apparatus with a second cable arrangement; and a third plug connector arranged at a first end of the second cable arrangement, by which an electrical plug connection is formed with the first plug connector of the first connection apparatus, wherein the pressure equalization apparatus has a second fluid guiding element, wherein a first end of the second fluid guiding element extends into the third plug connector of the second connection apparatus.

2. The transmission device as claimed in claim 1, wherein the pressure equalization apparatus has a first fluid guiding element which connects the first plug connector to the interior of the parking lock actuator.

3. The transmission device as claimed in claim 2, wherein the first fluid guiding element is guided together with the first cable arrangement from the parking lock actuator to the first plug connector.

4. The transmission device as claimed in claim 2, wherein the first plug connector has a plug connector housing, contact elements, and through openings which are formed in the plug connector housing and which are each designed to receive one of the contact elements, wherein the first fluid guiding element is inserted into one of the through openings.

5. The transmission device as claimed in claim 1, wherein the second end of the first cable arrangement is electrically connected to the parking lock actuator by a second plug connector of the first connection apparatus and the pressure equalization apparatus extends into the second plug connector.

6. The transmission device as claimed in claim 1, wherein the second connection apparatus has a fourth plug connector at a second end of the second cable arrangement.

7. The transmission device as claimed in claim 6, wherein the pressure equalization apparatus has a pressure equalization adapter at a second end of the second fluid guiding element.

8. The transmission device as claimed in claim 7, wherein the pressure equalization adapter and the fourth plug connector of the second connection apparatus are separate components.

9. The transmission device as claimed in claim 7, wherein the pressure equalization adapter has a membrane and/or a fastening means for fastening the pressure equalization adapter.

10. A drive device for the electrically driveable vehicle, comprising:

an electric machine;

the transmission device as claimed in claim 9; and a shaft transmitting a rotational motion of the electric machine to the transmission device.

11. The drive device as claimed in claim 10, wherein the transmission housing is part of a housing enclosing the electric machine, the transmission device, and the shaft.

12. The drive device as claimed in claim 11, wherein the pressure equalization adapter is fastened to the housing by the fastening means.

13. The drive device as claimed in claim 10, further comprising:

an inverter, wherein the fourth plug connector of the second connection apparatus is electrically connected to the inverter.

14. A vehicle, comprising: the drive device as claimed in claim 10, which is configured to drive the vehicle.

* * * * *